April 15, 1941.　　　F. J. WESTROPE　　　2,238,238
MOLDING FASTENER
Original Filed Nov. 2, 1938
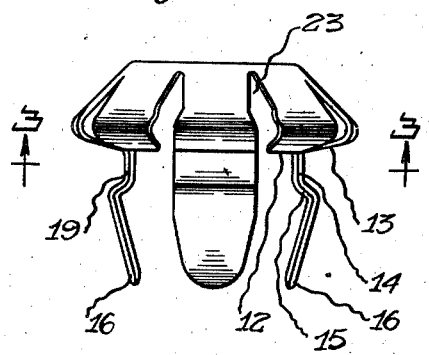
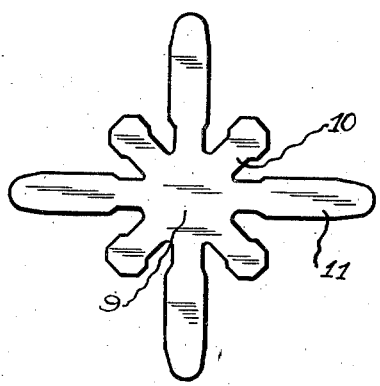
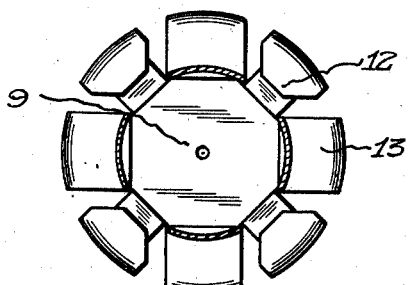
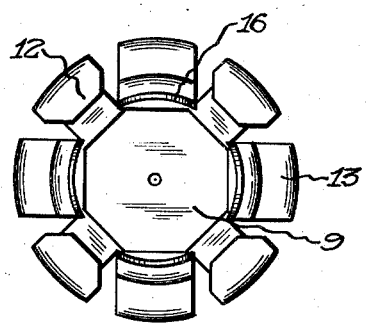
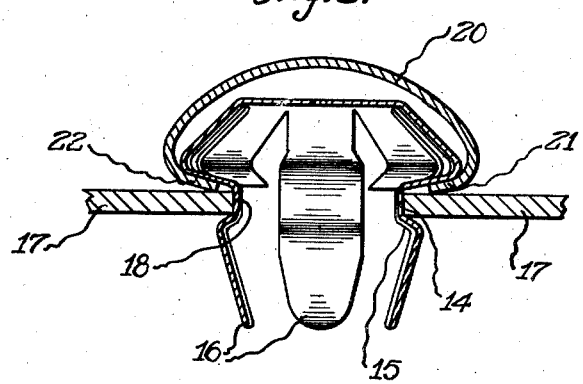
INVENTOR.
FRED J. WESTROPE.
BY
ATTORNEY.

Patented Apr. 15, 1941

2,238,238

UNITED STATES PATENT OFFICE 2,238,238

MOLDING FASTENER

Fred J. Westrope, Pleasant Ridge, Mich., assignor to F. L. Jacobs Company, Detroit, Mich., a corporation of Michigan Substituted for abandoned application Serial No. 238,467, November 2, 1938. This application December 13, 1940, Serial No. 370,025

2 Claims. (Cl. 24—73)

My invention relates to a new and useful improvement in a molding fastener adapted for use in securing moldings and other similar articles upon a panel or suitable supporting body. In securing a trim molding to panels or other suitable supporting bodies, it is customary to form spaced holes in the panel into which fastening members, to which the molding is attached, are projected.

Various devices have been developed for the purposes of easily and quickly securing the molding in position, but there are disadvantages in the various types formed, and it is an object of the present invention to provide a fastener of this class in which various disadvantages may be overcome.

It is an object of the present invention to provide a snap fastener which will be simple in structure, economical of manufacture, durable, easily and quickly installed, and highly efficient in use.

Another object of the present invention is the provision of a snap fastener having a plurality of resilient prongs bearing shoulders adapted to snap into the openings of the supporting body and carrying a head having resilient parts over which the molding is adapted to be snapped, the head and the prongs being so arranged that a maximum bearing against the supporting body is provided.

Another object of the invention is the provision of a fastener of this class so arranged and constructed that it will serve with equal efficiency regardless of the degree of rotation of the fastener in the panel or supporting body.

Another object of the invention is the provision of a fastener of this class formed preferably from a single sheet of metal and provided with legs radiating outwardly from the center of the head, these legs being alternately long and short, and having the long ones extended to provide securing prongs.

Other objects will appear hereinafter.

The invention will be best understood by a reference to the accompanying drawing which forms a part of this specification, and in which, Fig. 1 is a side elevational view of the invention.

Fig. 2 is a plan view of the blank from which the invention is formed.

Fig. 3 is a sectional view taken on line 3—3 of Fig. 1.

Fig. 4 is a bottom plan view of the invention.

Fig. 5 is a longitudinal, vertical, central, sectional view of the invention, showing a strip of molding in secured position.

This application is a substituted application to take the place of my abandoned application Serial Number 238,467 filed Nov. 2, 1938.

As shown in the drawing, I form the construction from a single sheet of metal having a central portion 9 radiating outwardly, from which are the shorter legs 10 which are equidistantly spaced around the center of the body 9. Radiating outwardly from this center or body 9 are the elongated legs 11 which are also equidistant so that there is provided alternately a long leg and a shorter one. These legs cooperate with the central portion and form with it a resilient head, the central portion or body 9 forming the crown or top of the head, and the legs forming the sides thereof. As shown in Fig. 1 and Fig. 5, a portion of each of the legs inclines outwardly from the crown 9. The ends 12 of the shorter legs are turned inwardly to extend at an angle to the longitudinal axis of the structure. The long legs are also turned inwardly as at 13 and then angularly turned to provide the portion 14, which extends substantially axially which is outwardly angularly turned to provide the shoulder forming portion 15, extending from which are the prong portions 16. In use, the device is used with a panel or suitable supporting body 17 having an opening 18 formed therein, and the prongs are projected through this opening. As shown in Fig. 1, the prongs converge toward each other toward their ends so that they may be readily inserted into the opening 18. As the legs slide into the opening they are flexed inwardly against the resiliency of the material of which the structure is made, until the portion 14 registers with the panel or body 17, whereupon these elongated legs snap outwardly leaving the body or panel 17 engaging in the channel 19. The angularly turned portion 15 will serve as a shoulder to engage one face of the panel or body 17 and the angularly turned portion 13 will engage the opposite side as a shoulder. In the use, the angularly turned shoulder forming portion 15 will engage the concealed or inner face of the panel, and the angularly turned portion 13 will engage against the exposed or outer face of the panel or supporting body. The angularly turned portions 12 of the short legs will also engage the outer face of the panel or supporting body and be flexed so that they will normally be placed under tension, thus securely holding the shoulder forming portion in close engagement with the inner face of the panel or supporting body 17. It is believed obvious that the placing of the securing of the fastener in an opening of the panel or supporting body is a simple operation which may be easily and quickly performed. It is also to be noted that when they are placed in position, a relatively small projection is extended outwardly beyond the outer face of the panel 17, this projection resembling in size, and somewhat in appearance, a screw head. Thus, the difficulty of having a large projection extending outwardly from the outer face is avoided.

In Fig. 5, I have indicated a strip of trim molding 20. The strip has been shown merely for the purposes of indicating since various styles and patterns of trim molding may be used. However, these strips of trim molding are each formed channel-shaped, having the inwardly projected flanges or edges 21 and 22 spaced from each other. In securing the trim molding on the fastener, after the fastener has been secured in the panel or supporting body, it is but necessary to snap the molding over the head of the fastener. This molding will slide downwardly on the inclined faces of the legs forcing these legs to flex inwardly against the resiliency of the material from which they are made. This is possible because of the space 23 which separates the legs. On one side of the fastener, it will be noted, I have provided two pairs of elongated fastening prongs which are positioned diametrically opposite each other. When the molding is snapped over the head, should the fastener be so turned that a pair of diametrically opposite legs should be engaged, they will be flexed inwardly so that the attachment of the head with the panel 17 by means of these legs, would be considerably diminished. But the other pair of legs, since they are rotated relatively to the first pair, will not be flexed inwardly and will still hold the fastener in position. Thus, I have provided a sufficient number of the fastener legs to prevent all of them from becoming disengaged from the supporting body or panel when the molding is snapped into position. The inward movement of these legs, when flexed inwardly by snapping the molding thereon, is indicated in dotted lines, Fig. 4.

It is believed obvious that by having the angularly turned portions on all of the legs engaging the outer face of the supporting body, or panel, I have provided a maximum engaging against this outer face, while at the same time, providing sufficient retention engagement with the inner face of the panel or supporting body to maintain the structure in position. It is also believed obvious that due to the tension developed by the angularly turned portions 12 being flexed, a rattling is prevented, and the molding is held against undue removal. The simplicity and durability of the device is believed obvious from the description given.

While I have described and illustrated the preferred form of construction, I do not wish to limit myself to the precise details of structure shown, but wish to avail myself of such variations and modifications as may come within the scope of the appended claims.

I claim:

1. A snap fastener of the class described, comprising: a central body portion; a plurality of legs radiating outwardly from said body portion circumferentially of the center thereof in spaced relation to each other, some of the legs being longer than the others, the ends of the short legs being angularly turned inwardly, and the longer legs being angularly turned inwardly intermediate their ends in substantial alignment with the inwardly turned ends of the short legs, said longer legs being thence directed axially of the structure and then turned angularly outwardly and thence bent to provide elongated prongs for insertion through an opening in a supporting body in which mounted the inwardly turned portions of said short legs and said long legs bearing against one face of said body and the outwardly angularly turned portions of the long legs bearing against the opposite face of said body, said longer legs serving to retain said structure on said supporting body and maintain the inwardly turned portions of the short legs under tension, there being more than a pair of said longer legs and located so that not more than two are in diametrical alignment with each other.

2. A snap fastener of the class described, comprising: a central body portion; a plurality of legs radiating outwardly from said body portion circumferentially of the center thereof in spaced relation to each other, some of the legs being longer than the others, the ends of the short legs being angularly turned inwardly, and the longer legs being angularly turned inwardly intermediate their ends in substantial alignment with the inwardly turned ends of the short legs, said longer legs being again angularly turned and extended in an axial direction to provide elongated prongs for insertion in an opening in a supporting body in which mounted, the inwardly turned portions of said short legs bearing against one face of said body and said longer legs engaging the opposite face of said body and extended outwardly therefrom, said longer legs serving to retain said structure on said supporting body and maintain the inwardly turned portions of the short legs under tension, there being more than a pair of said longer legs and located so that not more than two are in diametrical alignment with each other.

FRED J. WESTROPE.